Sept. 17, 1940.                    A. L. BELL                    2,214,758
                              WHEEL-BALANCING MACHINE
                          Filed Sept. 19, 1938        2 Sheets-Sheet 1
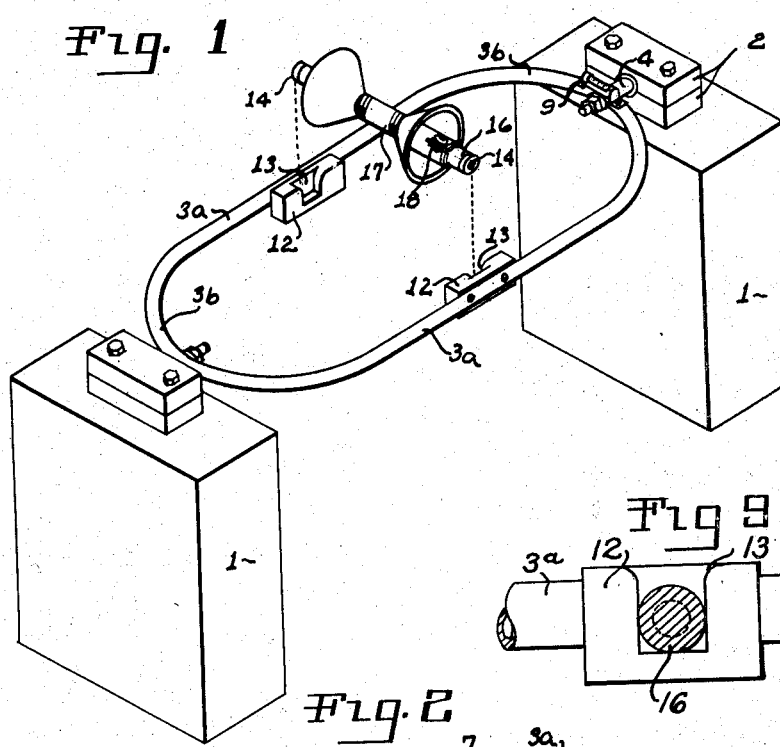
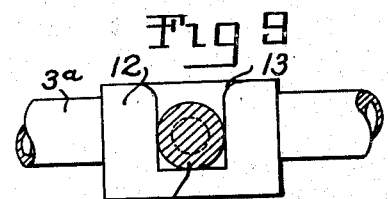
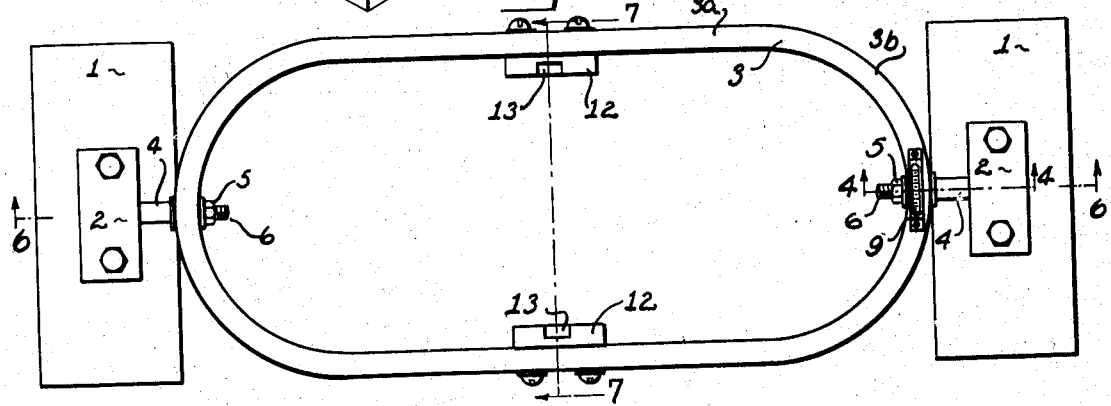
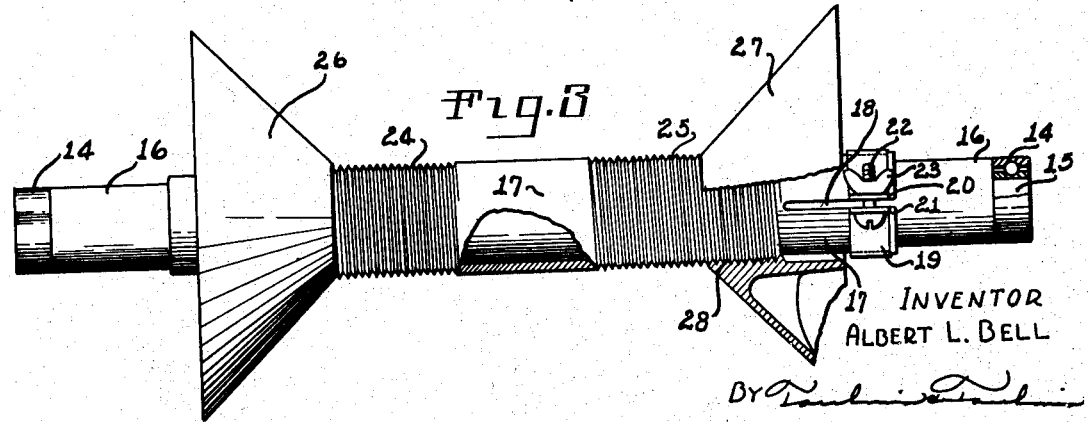
INVENTOR
ALBERT L. BELL
BY
ATTORNEYS

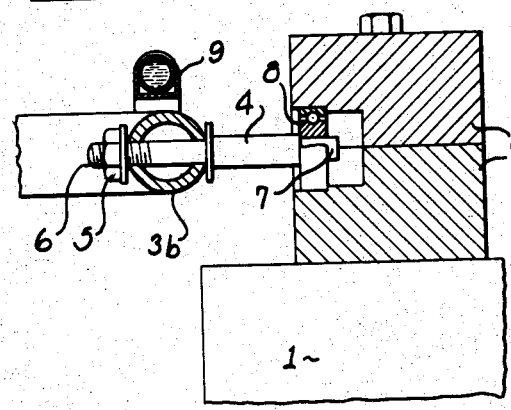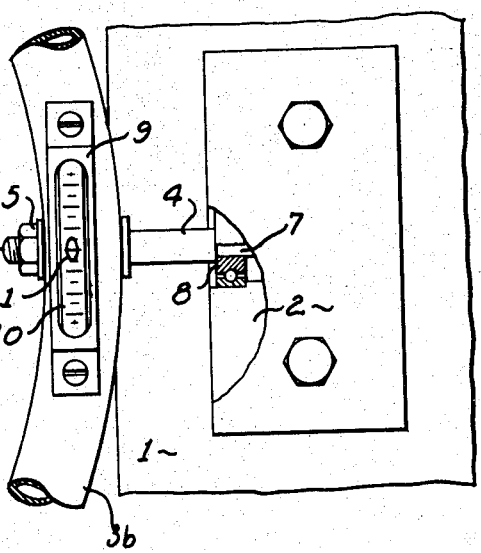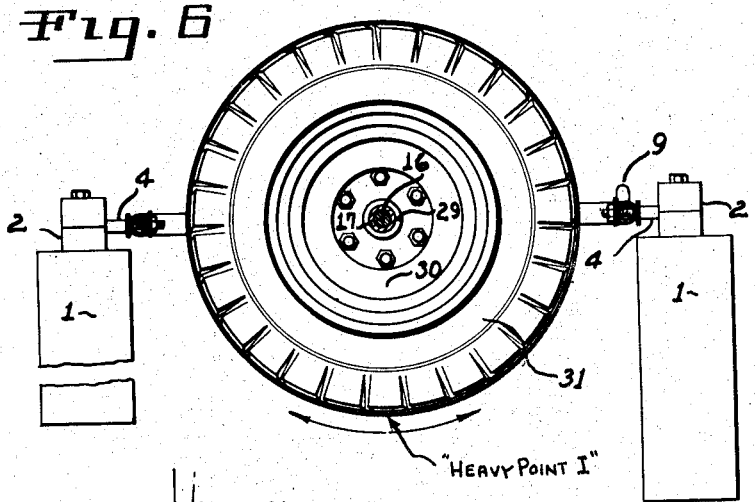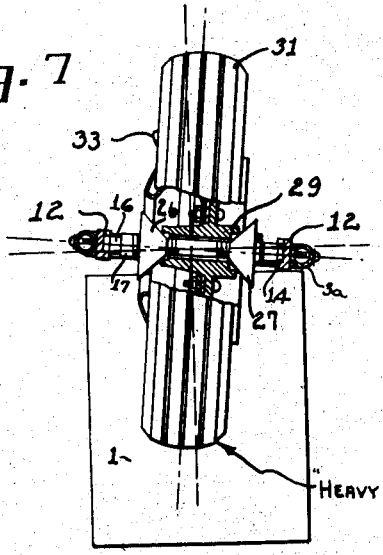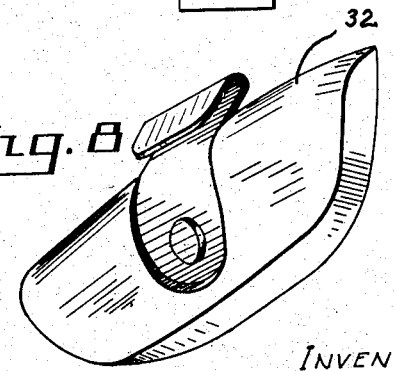

Patented Sept. 17, 1940

2,214,758

UNITED STATES PATENT OFFICE 2,214,758

WHEEL-BALANCING MACHINE

Albert L. Bell, Columbus, Ohio

Application September 19, 1938, Serial No. 230,600

9 Claims. (Cl. 73—53)

My invention relates to a wheel balancing machine, particularly adapted to wheels of automobiles.

It is the object of my invention to provide an apparatus that will quickly determine the static balance and the dynamic balance of an automobile wheel and its tire so that it may be suitably counter-balanced to prevent excessive tire wear, wheel shimmy and similar conditions.

It is my object to provide a mechanism of such simple character that any one with very slight mechanical knowledge can accurately test an automobile wheel and its tire for static and dynamic unbalance and restore them to balance by the application of suitable weights.

It is my object to provide a wheel balancing mechanism comprising a wheel support on which the wheel is laterally adjustable; a pivoted cradle pivotally supported at right angles to the points of the support of the tire on the cradle so that the vertical or static unbalance of the wheel and tire may be observed and thereafter the dynamic or horizontal unbalance observed and the location of the weights to correct the unbalance determined.

This solves the problem of a mechanism sufficiently simple for correction and perfect determination of the unbalanced condition of a wheel and tire, while at the same time, providing a mechanism that can be operated by persons of small mechanical experience, and cheap enough to be purchased widely so as to make available mechanism for the correction of wheel unbalance in automobile repair stations, garages and the like, which can not now afford the very complicated mechanisms on the market.

Referring to the drawings:

Figure 1 is a perspective of the wheel balancing machine of this invention with the axle about to be put into position, as indicated by the dotted lines.

Figure 2 is a top plan view thereof.

Figure 3 is a detailed side elevation partially in section, of the wheel axle and the adjusting and retaining mechanism thereon.

Figure 4 is a section on the line 4—4, looking in the direction of the arrows on Figure 2.

Figure 5 is a detailed plan view partially broken away, of the nature of the support at one end of the cradle and the arrangement of the sight level mounted on the end of the cradle.

Figure 6 is a section on the line 6—6 of Figure 2, looking in the direction of the arrows, showing the static or vertical balancing of the tire.

Figure 7 is a section on the line 7—7, looking in the direction of the arrows, of Figure 2 with the tire in position showing the hub of the wheel partially in section. This view illustrates the dynamic or horizontal balancing and the location of the weight to correct the unbalance.

Figure 8 is a perspective of a typical weight which is applied to correct the unbalanced condition of the wheel.

Figure 9 is a side sectional view through the end of the wheel supporting axle looking outwardly towards the cradle.

Referring to the drawings in detail, 1 are supports having bearing blocks 2. These supports may be of any character and those illustrated are purely diagrammatic. In practice, I prefer to use suitable metal frame-works.

3 designates a cradle having straight side members 3a and arcuate end members 3b. This cradle is supported at either end upon cradle axles 4, which pass through the tubular cradle in the end 3b and are bolted thereto by a nut 5 threaded on the thread 6 of the end of the axle 4.

The other end of the axle 4 is reduced in size, as at 7, and is mounted within a bearing 8 carried between the bearing blocks 2. There is also mounted upon the arcuate end of the end 3b of the cradle 3 a spirit level 9 having a scale 10 along which the bubble 11 passes in order to determine the horizontal position of the cradle 3.

The sides 3a of the cradle are provided with bearing blocks 12 having upwardly opening receiving slots 13 for the ball bearings 14 which are mounted upon the reduced end 15 of the wheel axle 16. This axle is provided with a sleeve 17 that is split at 18 at one end. It is provided with a strip 19, the ends thereof being connected together as at 20 and 21 by a screw bolt 22 having wing nut 23. This serves to adjustably clamp the sleeve 17 on the axle 16.

The exterior of this sleeve is threaded at either end at 24 and 25. At each end, these threaded portions 24 and 25 have conical wheel clamps 26 and 27 that are internally threaded, as at 28 and are rotatably mounted on the threaded ends 24 and 25, respectively, of the sleeve 17.

Method of operation

The method of correcting the static and dynamic unbalance of a wheel by using the apparatus of the present invention is as follows. Clamp 19 and cone 27 are removed from sleeve 17, the wheel is slipped over sleeve 17 and cone 27 is tightened up so as to secure the wheel so that it is not rotatable relative to sleeve 17 (i. e. turns therewith). The sleeve and wheel are then positioned approximately in the middle of axle 16 so that the cradle initially will be approximately horizontal and locked in this position by tightening clamp 19. The assembly is then placed in the cradle 3 by disposing bearings 14 in bearing blocks 12. The wheel is now freely rotatable about its own axis by reason of freely rotating ball bearings 14 and the cradle is freely rotatable about its own axis by reason of ball bearings 8. The operator now rotates the wheel slowly about its own axis, observing the level 10. As the wheel is thus rotated, the heavy point II located on one side of the wheel and causing dynamic unbalance is moved radially and causes the cradle to rotate about its own axis. Thus, as the heavy point II is brought from the position shown in Figure 7 to a position where it is in the plane of the cradle, the cradle will tilt from the position of Figure 7 toward the horizontal position. Continuing the rotation, as heavy point II is rotated from the plane of the cradle up above the cradle, the cradle will again tilt in the direction indicated in Figure 7, although to not as great an extent as when the heavy point was below the cradle. Then as heavy point II comes again into the plane of the cradle, the cradle will revert towards the horizontal position and finally as heavy point II moves towards the bottom again, it will cause the cradle to tilt to the angle of Figure 7. By noting the amount of deflection of the cradle from the horizontal during this rotation, the operator is able with experience to determine the amount of and location of the counterweight necessary to overcome dynamic unbalance.

As the operator thus rotates the wheel, he also notes the tendency of the wheel to come to rest with a particular point at the bottom. This point is heavy point I, shown in Figure 6, which causes static unbalance. With experience, the operator is able to determine in the rotating operation described above both the dynamic unbalance and the static unbalance, and to determine exactly how much counterweight is necessary and where to place it so as to correct both of these unbalances. He then applies one or more counterweights 32 at the proper position as at 33 and checks the wheel thus balanced.

Frequently, the same heavy point causes both dynamic and static unbalance, and in such case heavy points I and II of the drawings will coincide. In most cases the wheel will be in both dynamic and static unbalance and will tend to come to rest at a particular point about its own axis and will cause horizontal deflection of the cradle when it is rotated about its own axis. The same heavy point or different heavy points may cause this condition of dynamic and static unbalance. In some cases the wheel will be in static balance but dynamic unbalance. In such case the wheel will show no tendency to come to rest about its own axis at any particular point but will stop at any point, although on rotation the dynamic unbalance will cause horizontal movement of the cradle. In other cases the wheel will be in dynamic balance but static unbalance. In such case the wheel will show a tendency to come to rest about its own axis at a particular point but will show no deflection of the cradle when rotated about its own axis. In still other cases the wheel will be in perfect static and dynamic balance, in which case the wheel will not come to rest at any particular point when rotated about its own axis and will not show any horizontal deflection of the cradle when so rotated. An example of such a wheel is one balanced in accordance with the foregoing procedure.

Very rarely it happens that the wheel will be in perfect static balance but dynamically unbalanced and yet will not show the dynamic unbalance when rotated because of its location on axle 16. In case no unbalance, either static or dynamic, is indicated, the wheel should be moved slightly along axle 16 and re-checked in order to eliminate any such possibility.

The steps are then as follows:

Step 1.—The wheel is mounted between the cones 26 and 27 and immediately placed on the cradle. The chances are that the cradle will show considerable deflection, which fact occasions Step 2. In many cases the cradle would be sufficiently well balanced, whereupon the operator would omit Step 2.

Step 2.—The operator then shifts the sleeve 17 to the right or left along the shaft 16 until the cradle is fairly well balanced, whereupon the operator tightens the wing nut 23.

Step 3.—The operator then begins to turn the wheel a little at a time, noting both the indications of the spirit level 9, and the tendency of the wheel to come to rest on the shaft 16, i. e., the operator simultaneously checks, respectively, the dynamic and the static balance. With practice the operator will know where to place the counterweights to correct both types of unbalance at once. This is perhaps the greatest advantage of this machine over others, where weights are first attached to correct static unbalance, and the wheel is then transferred to a machine which tests the dynamic unbalance, or a separate operation must be performed to determine the static condition. Thus the operator's job is greatly complicated by such a procedure.

Step 4.—If no unbalance is indicated in Step 3, the wheel is probably a perfectly balanced one. However in order to obviate the rare chance that the dynamic unbalance did not register because of the wheel's position on the shaft 16, the sleeve 17 is adjusted slightly to the right or left, and Step 3 is again repeated.

It is obvious that this operation is one that can be performed by any person with a very modest mechanical knowledge as the observations are simple, but the result, as I have tested it, is an accurate and correct one.

It will be readily appreciated that the mechanism of this invention, as illustrated and described, may be varied in a great many ways while still maintaining the use of the principle of this invention.

It will be understood that I desire to comprehend within my invention such modifications as may be necessary to adapt it to varying conditions and uses.

Having thus fully described my invention, what I claim as new and desire to secure by Letters Patent, is:

1. In a wheel balancing machine, the combination of a cradle, means at the ends thereof for pivotally supporting said cradle to freely rotate about the central longitudinal axis thereof, a wheel supporting axle pivotally mounted intermediate the ends of said cradle and normal to the pivotal axis of the cradle whereby the wheel is free to turn in a vertical plane to indicate its static and dynamic unbalance, and means for adjusting the wheel along said axle.

2. In combination in a wheel balancing machine, a cradle comprising a frame having spaced side members and interconnecting end members, means for freely and pivotally supporting said cradle at its ends, means for supporting an axle freely intermediate the ends of said cradle and at right angles to said cradle-supporting means comprising receiving socket blocks and a wheel supporting axle adapted to have its ends mounted in said blocks, an adjustable sleeve on said axle having threaded ends and clamping members adjustably threaded thereon.

3. In a wheel balancing machine, the combination of a cradle, axles at the ends of said cradle, ball bearings on the ends of said axles, means of supporting said cradle on said bearings, means of indicating the horizontal position of said cradle mounted thereon, axle supporting means on either side of said cradle arranged to support an axle at right angles to the axles on either end of said cradle, an axle having ball bearings on either end thereof supported on the sides of said cradle transversely from side to side thereof, and means on said axle for adjustably positioning a wheel and tire thereon.

4. In a wheel balancing machine, the combination of a cradle, axles at the ends of said cradle, ball bearings on the ends of said axles, means of supporting said cradle on said bearings, means of indicating the horizontal position of said cradle mounted thereon, axle supporting means on either side of said cradle arranged to support an axle at right angles to the axles on either end of said cradle, an axle having ball bearings on either end thereof supported on the sides of said cradle transversely from side to side thereof, and means on said axle for adjustably positioning a wheel and tire thereon, said adjustable means comprising a sleeve adjustably mounted on said axle, said sleeve having oppositely threaded ends and conical wheel clamps oppositely disposed thereon and threaded therein.

5. In a balancing machine, the combination of a cradle, means allowing said cradle to freely rotate about a central horizontal axis thereof, means associated with said cradle for receiving a rotatable body with its axis normal to said horizontal axis and allowing said body to rotate on its own axis, and means for adjusting said body laterally of said cradle on its own axis.

6. In a balancing machine, the combination of a cradle, means allowing said cradle to freely rotate about a central horizontal axis thereof, means for indicating the horizontal position of said cradle, and means associated with said cradle for receiving a rotatable body with its axis normal to said horizontal axis and allowing said body to rotate on its own axis.

7. In a balancing machine, the combination of a cradle, means disposed in line with a central horizontal axis of said cradle allowing said cradle to freely rotate about said horizontal axis, means for indicating the horizontal position of said cradle, and means associated with said cradle for receiving a rotatable body with its axis normal to said horizontal axis and in the same plane and for allowing said body to rotate on its own axis.

8. In a balancing machine, the combination of a cradle pivotally supported so as to be freely rotatable about a central horizontal axis therethrough, and means associated with said cradle for receiving a rotatable body with its axis normal to said horizontal axis and with its center approximately in line with said horizontal axis and for allowing said body to rotate on its own axis.

9. In a balancing machine, the combination of a cradle pivotally supported so as to be freely rotatable about a central horizontal axis therethrough, means associated with said cradle for receiving a rotatable body with its axis normal to said horizontal axis and with its center approximately in line with said horizontal axis and for allowing said body to rotate on its own axis, and a level mounted on said cradle in such manner as to indicate the deviation of said cradle from the horizontal position.

ALBERT L. BELL.